US008229221B2

(12) United States Patent
Le Roux et al.

(10) Patent No.: US 8,229,221 B2
(45) Date of Patent: Jul. 24, 2012

(54) IMAGE PROCESSING USING MASKED RESTRICTED BOLTZMANN MACHINES

(75) Inventors: Nicolas Le Roux, Cambridge (GB); John Winn, Cambridge (GB); Jamie Daniel Joseph Shotton, Cambridge (GB); Nicolas Manfred Otto Heess, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 12/535,178

(22) Filed: Aug. 4, 2009

(65) Prior Publication Data

US 2011/0033122 A1 Feb. 10, 2011

(51) Int. Cl.
*G06K 9/34* (2006.01)
(52) U.S. Cl. ......................... 382/173; 382/155
(58) Field of Classification Search .................. 382/154, 382/155, 158, 160, 173, 226, 283; 706/25
See application file for complete search history.

(56) References Cited

U.S. PATENT DOCUMENTS

| 7,333,998 | B2 | 2/2008 | Heckerman et al. | |
| 2008/0069438 | A1* | 3/2008 | Winn et al. | 382/160 |
| 2008/0075367 | A1 | 3/2008 | Winn et al. | |
| 2008/0137989 | A1 | 6/2008 | Ng et al. | |

FOREIGN PATENT DOCUMENTS

WO WO2008133951 A2 11/2008

OTHER PUBLICATIONS

Ackley, et al., "A Learning Algorithm for Boltzmann Machines", retrieved on Jun. 19, 2009 at <<http://papers.cnl.salk.edu/PDFs/A%20Learning%20Algorithm%20for%20Boltzmann%20Machines_%201985-3542.pdf>>, Cognitive Science 9, 1985, pp. 147-169.

"Boltzmann Machines and Deep Belief Networks", retrieved on Jun. 19, 2009 at <<http://plearn.berlios.de/machine_learning/node4.html>>, pp. 1-7.

Freund, et al., "Unsupervised learning of distributions on binary vectors using two layer networks", retrieved on Jun. 19, 2009 at <<http://citeseerx.ist.psu.edu/viewdoc/download;jsessionid=222F08029D9EA7E2F4ECA6395A80668F?doi=10.1.1.29.5728&rep=rep1&type=pdf>>, Baskin Center for Computer Engineering & Information Sciences, University of California, Santa Cruz, UCSC-CRL-94-25, 1994, pp. 1-40.

Hinton, et al., "A fast learning algorithm for deep belief nets *", retrieved on Jun. 19, 2009 at <<http://www.cs.toronto.edu/~hinton/absps/fastnc.pdf>>, 16 pages.

(Continued)

*Primary Examiner* — Duy M Dang
(74) *Attorney, Agent, or Firm* — Lee & Hayes, PLLC

(57) ABSTRACT

Image processing using masked restricted Boltzmann machines is described. In an embodiment restricted Boltzmann machines based on beta distributions are described which are implemented in an image processing system. In an embodiment a plurality of fields of masked RBMs are connected in series. An image is input into a masked appearance RBM and decomposed into superpixel elements. The superpixel elements output from one appearance RBM are used as input to a further appearance RBM. The outputs from each of the series of fields of RBMs are used in an intelligent image processing system. Embodiments describe training a plurality of RBMs. Embodiments describe using the image processing system for applications such as object recognition and image editing.

20 Claims, 11 Drawing Sheets

OTHER PUBLICATIONS

Kohli, et al., "Robust Higher Order Potentials for Enforcing Label Consistency", retrieved on Jun. 19, 2009 at <<http://research.microsoft.com/en-us/um/people/pkohli/papers/klt_cvpr08.pdf>>, pp. 1-8.

Kumar, et al., "Discriminative Random Fields", retrieved on Jun. 19, 2009 at <<http://vision.ai.uiuc.edu/~sintod/KumarHerbert_IJCV06.pdf>>, International Journal of Computer Vision 68 (2), Springer Science, 2006, pp. 179-201.

Larochelle, et al., "An Empirical Evaluation of Deep Architectures on Problems with Many Factors of Variation", retrieved on Jun. 19, 2009 at <<http://www.cs.toronto.edu/~amnih/cifar/talks/erhan_talk.pdf>>, CIAR Summer School, 2007, 24 pages.

Lee, et al., "Sparse deep believe net model for visual area V2", retrieved on Jun. 19, 2009 at <<http://books.nips.cc/papers/files/nips20/NIPS2007_0934.pdf>>, pp. 1-8.

Lu, et al., "A Scalable and Programmable Architecture for the Continuous Restricted Boltzmann Machine in VLSI", retrieved on Jun. 19, 2009 at <<http://ieeexplore.ieee.org//stamp/stamp.jsp?tp=&arnumber=04252884>>, IEEE, 2007, pp. 1297-1300.

Osindero, et al., "Modeling image patches with a directed hierarchy of Markov random fields", retrieved on Jun. 19, 2009 at <<http://www.cs.toronto.edu/~hinton/absps/lateral.pdf, pp. 1-8.

Ranzato, et al., "Sparse Feature Learning for Deep Belief Networks", retrieved on Jun. 19, 2009 at <<http://yann.lecun.com/exdb/publis/pdf/ranzato-nips-07.pdf>>, pp. 1-8.

Ross, et al., "A Systematic Approach to Learning Object Segmentation from Motion", retrieved on Jun. 19, 2009 at <<http://web.mit.edu/mgross/www/publications/mgrlpk-cvw-paper-03.pdf>>, 8 pages.

Roth, et al., "Fields of Experts: A Framework for Learning Image Priors", retrieved on Jun. 19, 2009 at <<http://ieeexplore.ieee.org/stamp/stamp.jsp?tp=&isnumber=31473&arnumber=1467533>>, IEEE, 8 pages.

Shotton, et al., "Semantic Texton Forests for Image Categorization and Segmentation", retrieved on Jun. 19, 2009 at <<http://ieeexplore.ieee.org/stamp/stamp.jsp?tp=&arnumber=4587503&isnumber=4587335>>, IEEE, 2008, 8 pages.

Shotton, et al., "TextonBoost for Image Understanding: Multi-Class Object Recognition and Segmentation by Jointly Modeling Texture, Layout, and Context", retrieved on Jun. 19, 2009 at <<http://johnwinn.org/Publications/papers/TextonBoost_IJCV2009.pdf>>, 2007, pp. 1-30.

Smolensky, "Information Processing in Dynamical Systems: Foundations of Harmony Theory", Parallel Distributed Processing: Exploration in the Microstructure of Cognition, vol. I: Foundations, Chapter 6, MIT Press, Cambridge, 1986, pp. 194-281.

"The PASCAL Visual Object Classes Challenge 2008 (VOC2008) Results", retrieved on Jun. 19, 2009 at <<http://pascallin.ecs.soton.ac.uk/challenges/VOC/voc2008/results/index.shtml>>, 2009, pp. 1-5.

Tieleman, "Training Restricted Boltzmann Machines using Approximations to the Likelihood Gradient", retrieved on Jun. 19, 2009 at http://portal.acm.org/ft_gateway.cfm?id=1390290&type=pdf&coll=GUIDE&dl=GUIDE&CFID=41904854&CFTOKEN=51911951>>, Proceedings of the 25th International Conference on Machine Learning, 2008, pp. 1064-1071.

Tu, et al., "Image Parsing: Unifying Segmentation, Detection, and Recognition", retrieved on Jun. 19, 2009 at <<http://lear.inrialpes.fr/people/triggs/events/iccv03/cdrom/iccv03/0018_chen.pdf>>, Proceedings of the Ninth IEEE International Conference on Computer Vision (ICCV 2003), IEEE, 2003, 8 pages.

Tu, et al., "Image Segmentation by Data-Driven Markov Chain Monte Carlo", retrieved on Jun. 19, 2009 at <<http://www.stat.ucla.edu/~sczhu/papers/DDMCMC_reprint.pdf>>, IEEE Transactions on Pattern Analysis and Machine Intelligence, vol. 24, No. 5, 2002, pp. 657-673.

Zhu, et al., "A Stochastic Grammar of Images", retrieved on Jun. 19, 2009 at <<http://www.stat.ucla.edu/~sczhu/papers/Reprint_Grammar.pdf>>, Foundations and Trends in Computer Graphics and Vision, vol. 2, No. 4, 2006, pp. 259-362.

* cited by examiner

IMAGE PROCESSING USING MASKED RESTRICTED BOLTZMANN MACHINES

BACKGROUND

Generative models are capable of learning the structure of highly complex data without supervision. There have been many attempts to construct generative models capable of representing the wide variety of structures present in natural images. However these models are not capable of outperforming discriminative models on tasks such as object detection, classification and segmentation. This is despite the fact that generative models can learn from the vast number of unlabelled images available online.

A previous image processing system has used a generative model formed from layers of restricted Boltzmann machines (RBMs). Restricted Boltzman machines are a type of Boltzmann machine comprising symmetrically connected hidden and visible nodes. There are no connections between the visible nodes and no connections between the hidden nodes. The restricted Boltzmann machines can be stacked in layers using the output of the hidden nodes of one layer as input for the next layer. Training of restricted Boltzmann machines is generally much faster than training of regular Boltzmann machines, which have connection between hidden nodes and between visible nodes.

Previous image processing systems using layers of restricted Boltzmann machines have difficulty representing object or texture boundaries since these represent a transition from one set of image statistics to another. When there are not enough hidden units in a restricted Boltzmann machine to perfectly model the distribution there is a 'blurring effect'. Two input variables that are nearly always similar to one another but may occasionally be radically different, such as pixels in an image which are only radically different at a boundary between two image objects, will be assigned a mean value. This means that transitions between objects in an image are poorly represented. The outputs of such image processing systems are then of reduced quality and performance on tasks such as automated object recognition, object segmentation, intelligent image editing and other such tasks is reduced.

In general it is required to provide an image processing systems incorporating a generative model capable of learning the structures present in natural images. Such a model has a wide variety of uses in image processing fields, a non-exhaustive list of examples is: image editing; image segmentation; compression; object recognition; and modeling motion capture data.

The embodiments described below are not limited to implementations which solve any or all of the disadvantages of known image processing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image processing using masked restricted Boltzmann machines is described. In an embodiment restricted Boltzmann machines based on beta distributions are described which are implemented in an image processing system. In an embodiment a plurality of fields of masked RBMs are connected in series. An image is input into a masked appearance RBM and decomposed into superpixel elements. The superpixel elements output from one appearance RBM are used as input to a further appearance RBM. In an example, the outputs from each of the series of fields of RBMs are used in an intelligent image processing system. Embodiments describe training a plurality of RBMs. Embodiments describe using the image processing system for applications such as object recognition and image editing.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image processing system, the system described is provided as an example and not a limitation. As those skilled in the art will appreciate, the present examples are suitable for application in a variety of different types of data processing systems. A non-exhaustive list of examples is: data compression; data dimensionality reduction; object recognition; modeling motion capture data, medical image analysis.

Figure 1:
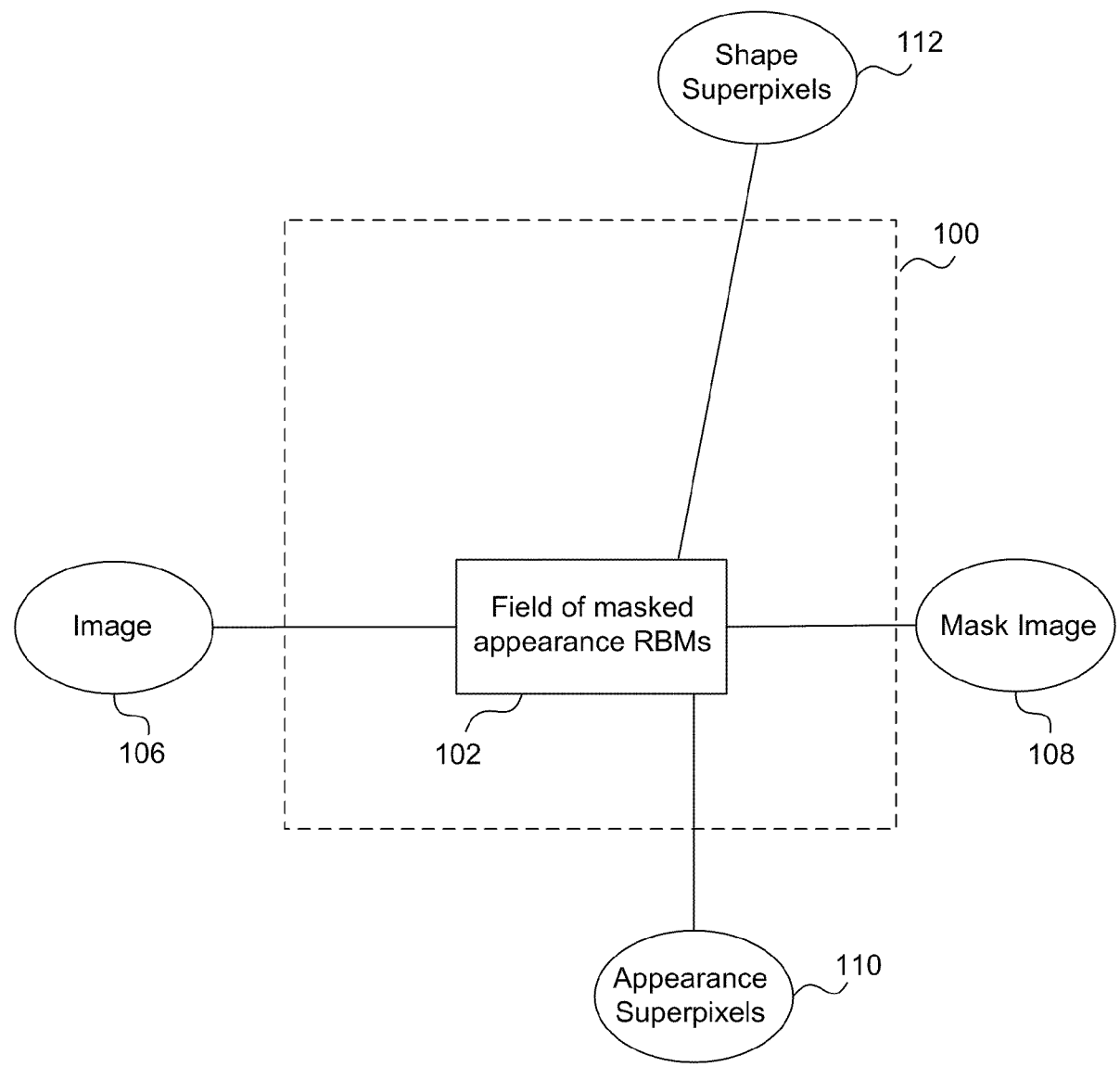
FIG. 1 is a schematic diagram of an image processing apparatus for processing an image using masked RBMs in order to produce high level representations of that image.

The image processing apparatus described in embodiments below stores restricted Boltzmann machines as data structures in the memory. FIG. 1 is a schematic diagram of an image processing apparatus for processing an image using masked RBMs in order to produce high level representations of that image. The image processing apparatus 100 comprises a field of masked appearance RBMs 102 which comprises a mask model. The input consists of an image 106 which may be an image of a natural scene or may be any suitable type of image. A non-exhaustive list of examples is: digital photograph, medical image, range scan, z-camera image, video. The field of masked appearance RBMs 102 decomposes the image 106 into a plurality of appearance superpixel elements 110. The mask model decomposes the image into a plurality of shape superpixel elements 112. A mask image is formed which comprises a variable value for each image element of the image, that value indicating which of a plurality of possible appearance RBMs best explains or describes the input image 106. The field of appearance RBMs is described with regard to FIGS. 2 and 3 below. The mask model is described with regard to FIG. 4 below.

Restricted Boltzmann machines (RBMs) are described in detail in Smolensky, 1986 "Information processing in dynamical systems: Foundations of harmony theory. In D. E. Rumelhart and J. L. McClelland (Eds.), Parallel distributed processing, vol. 1, chapter 6, 194-281. Cambridge: MIT Press," which is incorporated herein by reference in its entirety.

Figure 2:
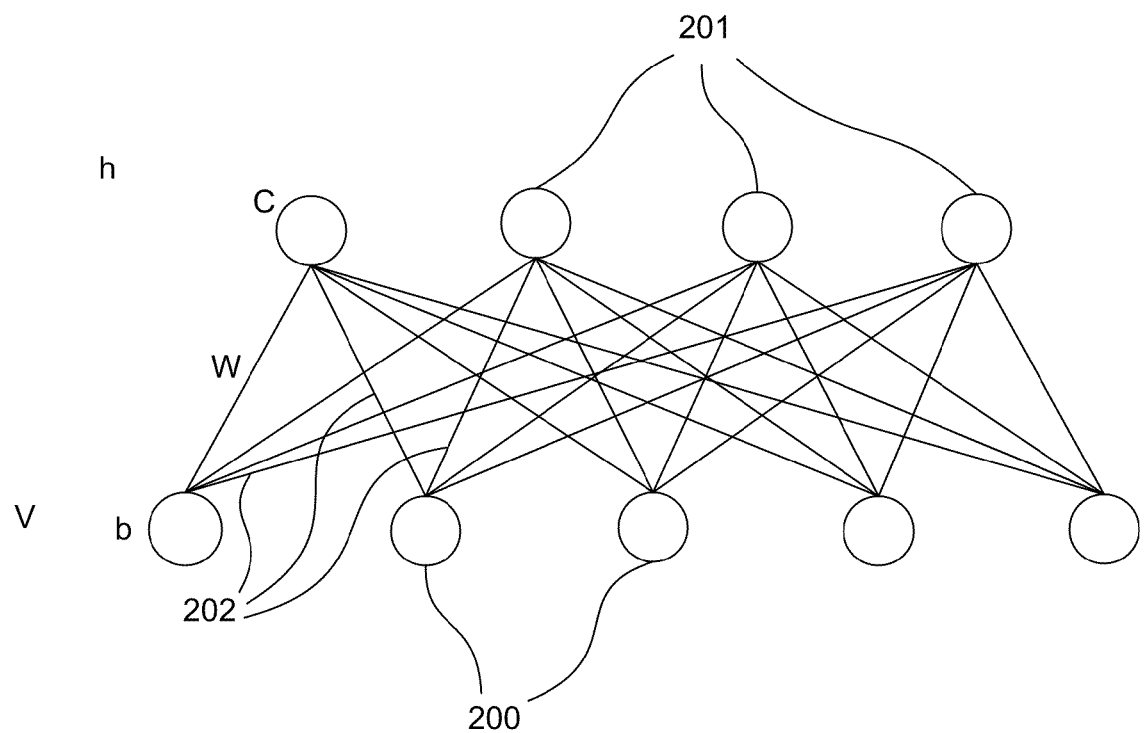
FIG. 2 is a schematic diagram of a restricted Boltzmann machine (RBM)

RBMs have one layer of visible units (input units) and one layer of hidden units with no visible-visible or hidden-hidden connections. The RBMs are stored as a data structure in memory. FIG. 2 is a schematic diagram of part of such an RBM. Five visible units 200 are shown although many more of these are used in practice. A single layer of hidden units 201 is illustrated with each visible unit connected to each hidden unit using a connection 202 with weight w. The hidden units are represented by the symbol h and each has an associated bias c. The visible units are represented by the symbol v and each has an associated bias b. There are no direct connections between two hidden nodes or between two visible nodes. The weights and biases are known as the parameters of the RBM.

The visible nodes may be thought of as those whose states may be observed whilst the hidden nodes have states which are not specified by the observed data. In the embodiments described herein the hidden units are used to learn binary features (latent variables) which capture higher-order structure in the input data.

RBMs are typically used for modeling binary input data. However, in the embodiments described herein, continuous, real-valued data is used as input. In the case of binary input data, an input vector is a binary vector with one value in the vector for each of the input nodes. In the case of continuous data, the input vector comprises a real value for each of the input nodes. In both cases the latent variables are binary.

The RBM is trained using training data which is continuous and which is of a similar type to that required by the application which is to use the trained RBM. In the embodiments described below the RBM is used as an image processing system. The training data may comprise hundreds of thousands of image regions taken from natural images. Any suitable training rule may be used, such as gradient descent. Gradient descent with persistent contrastive divergence is described in detail in "Tieleman 2008, Training restrictive Boltzmann machines using approximations to the likelihood gradient. Proc. ICML" which is incorporated herein by reference in its entirety.

An RBM used for modeling binary input data is known as a binary RBM. A binary RBM with n hidden units is a parametric model of the joint distribution between hidden variables $h_j$ (explanatory factors, collected in vector h) and observed variables $v_i$ (the observed data, collected in vector v), of the form $$P(v,h) \propto e^{-E(v,h)} = e^{v^T W h + b^T v + c^T h} \quad (1)$$

with parameters $\theta=(W,b,c)$ and $v_i, h_j \in 0,1$ (C is the normalizing constant). E(v,h) is the energy of the state (v,h). Both conditional distributions P(v|h) and P(h|v) are factorial and thus easy to sample from. The marginal distributions can be easily computed up to a normalizing constant. Furthermore, one can also sample from the model distribution using Gibbs sampling.

An RBM is defined by the joint probability distribution over visible and latent variables. In the examples described herein, to model continuous real valued input data the probability distribution defined in equation (1) above is used. In the examples described herein the conditional distributions P(v|h) are Beta distributions. In other examples these may be other forms of distributions such as Gaussian distributions.

Beta distributions are able to model the mean and the variance of continuous data. In the embodiments described herein the hidden units are arranged to be binary so that the neural network acts as a data processing system which takes continuous data and forms a binary value at each of the hidden nodes. The technical problem of quickly and accurately mapping the data to binary values while preserving the high level structure in the data is difficult. Previous approaches to this problem have often produced inaccurate and poor representations of the input data and/or have been complex and time consuming to implement.

The RBM is therefore a Beta RBM. The conditional distribution P(v|h) has the form $$\log P(v, h) = \log(v)^T W^\alpha h + \log(v)^T U^\alpha (1-h) + \log(1-v)^T W^\beta h + \\ \log(1-v)^T U^\beta (1-h) + c^T h - \log(v) - \log(1-v) - \log C \quad (2)$$

where $W^\alpha, W^\beta, U^\alpha, U^\beta$ have positive entries.

As mentioned above, an RBM is first trained using a set of training data (for example, hundreds of thousands of state vectors, called training vectors which correspond to image patches) and using a suitable learning rule. During training the network eventually reaches an equilibrium in which the probability of a state vector is determined by the energy of that state vector relative to the energies of all possible state vectors according to an energy function. The energy function, together with the weights and biases can be thought of as defining the relationships between the nodes. During training the aim is to find weights and biases such that with the given energy function, the training vectors have a high probability. Training of the RBMs is described further with reference to FIG. 6 herein below.

A RBM will capture the higher order interactions between visible units to the limits of its representational power, which is determined by the number of hidden units. It is recognized herein that, when there are not enough hidden units to perfectly model the training distribution there is a "blurring" effect. Two nearby pixels are typically highly dependent, but these dependencies can break down if an edge is present between the two pixels. An RBM will not capture this rare different and will assign a mean value to both variables. This results in a poor generative model of the image.

It is recognized herein that, to avoid this effect with a standard RBM the number of hidden units required would be prohibitive. This number of hidden units would be inefficient as most would remain unused most of the time. The number of hidden units held in the data structure would also require a large amount of memory. A new type of image processing system which uses a masked RBM is therefore described herein which does not require a large number of hidden units to maintain consistency with the input dataset.

The data structure held in the memory of the image processing device comprises a plurality of restricted Boltzmann machines arranged to receive input in the form of an image patch. Additionally the data structure also comprises a set of mask variables.

Figure 3:
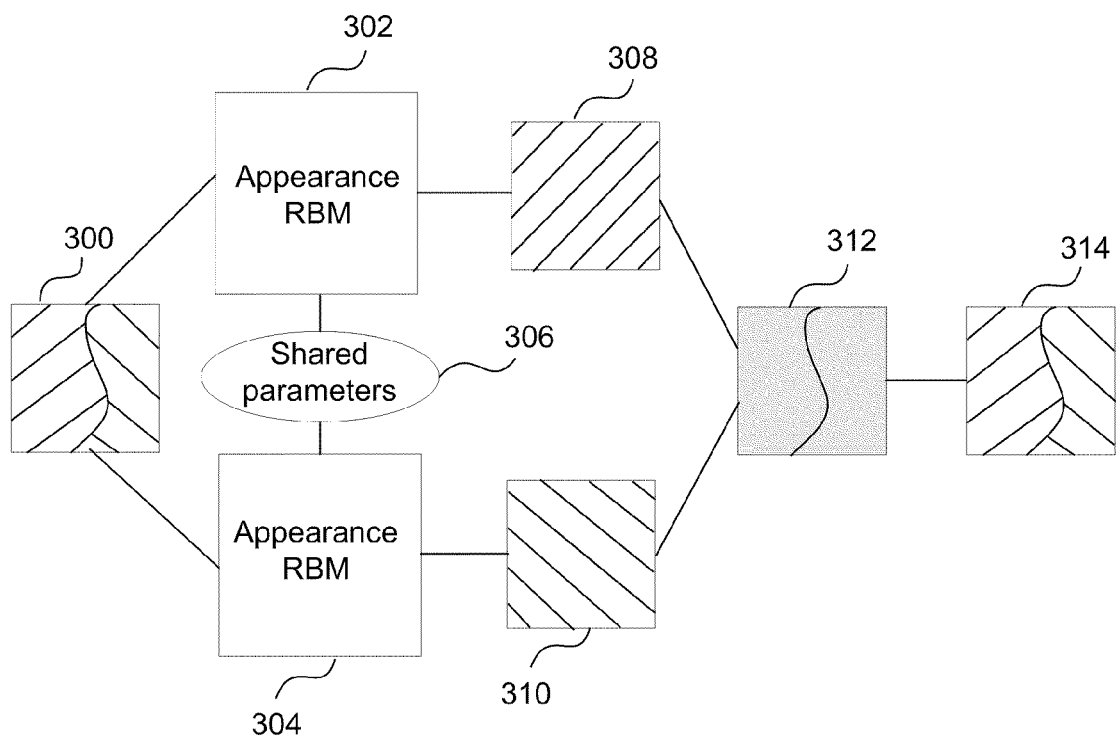
FIG. 3 is a schematic diagram of a masked RBM.

FIG. 3 is a schematic diagram of a masked RBM. An image patch 300 containing an edge is explained (that is, output image patch 314 is generated corresponding to the input image patch 300) using competing appearance RBMs 302, 304. The competing appearance RBMs share parameters 306. Any appearance RBM may be used to model any region of the image and therefore cannot be object specific. Thus shared parameters are used across the competing appearance RBMs. The first appearance RBM 302 produces a latent image patch 308 from the activations of its hidden units when the input image patch 300 is presented. The second appearance RBM 304 produces another latent image patch 310. Which latent image patch is used to model each image element of the input image is controlled by a mask 312.

In FIG. 3 only two appearance RBMs are shown for reasons of clarity but there can be any number K of competing appearance RBMs. The mask 312 is in the form of one mask variable per pixel $m_i$, which can take as many values as there are competing RBMs. The description given here refers to pixels although it is noted that any suitable unit of image element may be used such as blocks or groups of pixels. The term "superpixel" is used to refer to a representation formed using information from a plurality of image elements. By using the term "superpixel" herein the embodiments are not intended to be limited to examples which use pixels as the image elements.

Using the generic form of the RBM $$\log P(v, h_K^{(a)}) = \sum_{ij} f(\theta, v_i, h_{kj}^{(a)}) - \log C \quad (3)$$

where f depends on the type of RBM chosen. Given the mask m 312, the energy of a joint state is $\{v, v_1, \ldots, v_K, h_1^{(a)}, \ldots, h_K^{(a)}\}$, where v is the image patch, $\hat{v}_K$ is the k-th latent patch and $h_k^{(a)}$ the hidden state of the k-th layer is equal to $$\sum_i \left[ \log \delta(\hat{v}_{m_i} = v_i) + \sum_j \sum_k f(\theta, \hat{v}_{k,i}, h_{k,j}^{(a)}) \right] - \log C. \quad (4)$$

When K=1 the image processing apparatus is an unmasked beta RBM and is unable to capture sharp edges in an image. For the same number of hidden units, storing the mask and the hidden units for the appearance RBM, the reconstruction accuracy is much greater when K>1. The mask is able to capture the shape of the image. Thus a more accurate image reconstruction is obtained with relatively few hidden units. Preferably a majority of the bits are assigned to the mask rather than the appearance RBMs.

Figure 4:
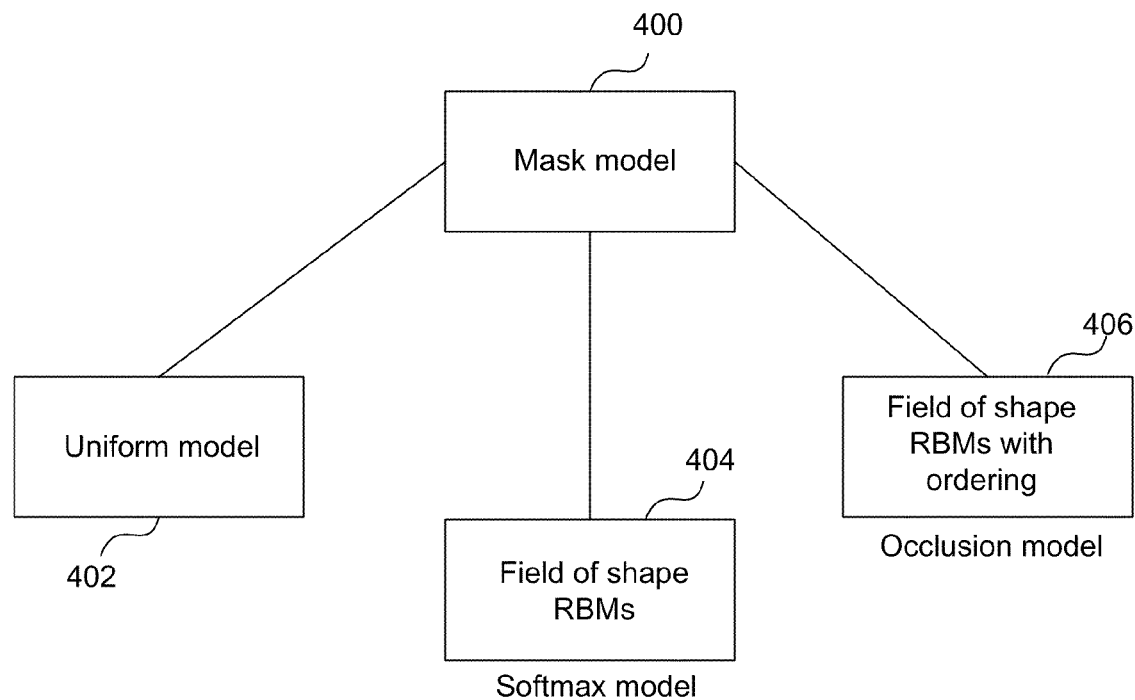
FIG. 4 is a schematic diagram of a mask model.

The energy of equation 4 can be used to define a conditional distribution given the mask. To get a full probability distribution over the joint variables it is necessary to define a distribution over the mask. FIG. 4 is a schematic diagram of a mask model 400. The mask model 400 may be any description of how to combine a plurality of RBMs with a mask. Examples of three possible mask models are now given although other possible mask models may be used. The three example mask models now described are: the uniform model 402; the softmax model 404; and the occlusion model 406. The softmax and occlusion models are comprised of further restricted Boltzmann machines stored within the memory structure, described herein as shape RBMs The simplest mask model is a uniform model 402. The uniform model is a uniform distribution over m. No mask is preferred a priori and the inferred mask is solely determined by the image. The mask is sampled by iteratively sampling the hidden units given the mask and image patch, then sampling the mask given the image patch and the hidden units. For a given unit the inferred mask can be different each time.

The softmax model 404 comprises a plurality of K shape RBMs competing to explain each mask pixel. To determine the value of $m_i$ given the K sets of hidden states requires computing a softmax over the K hidden inputs. The joint probability distribution of this model is $$\log P(m, h_1^{(a)}, \ldots, h_K^{(s)}) = \sum_{k=1}^{K} \sum_i \sum_j \delta(m_i = k) W_{ij} h_{k,j}^{(s)} - \log C \quad (5)$$

This model makes the implicit assumption that all the objects in an image are at the same depth. An occlusion occurs when an object in an image is at least partly hidden by another object. When object A is occluding object B, the occluded region is considered as not belonging to object B rather than unobserved. As a consequence, the model is forced to learn the shape of the visible regions of occluded layers for each new image. There is also no direct correspondence between the hidden states of any single layer and the corresponding object shape, since the observed shape will jointly depend on the K inputs.

In the occlusion model objects are explicitly represented by introducing an ordering S of the layers. S(1) is the foreground and S(K) the background. Each layer contains a shape. For this shape to be visible there must not be any other shape in the same location in the layers above. The joint probability distribution of this model is $$\log P(m, s_1, \ldots, s_K, h_1^{(s)}, \ldots, h_K^{(s)}, s) = \log P(S) + \sum_k s_{k,i} h_{k,j}^{(s)} W_{l,j} + \quad (6)$$

$$\sum_i \left[ \log \delta(s_{m_i,i} = 1) + \sum_{k/S(k) < S(m_i)} \log \delta(S_{k,i} = 0) \right] - \log C$$

P(S) is the prior over the depth ordering. In the occlusion model there is a direct correspondence between the hidden states and the shape of the object.

To compute the likelihood of an ordering S a sample of the occluded mask pixels is computed given the un-occluded pixels to obtain K latent shapes $(s_1, \ldots, s_K)$. The likelihood of this particular ordering is computed using the product of the unnormalized probabilities of these latent shapes. Doing so for all possible orderings allows the image processing system to draw a sample from P(S|m).

The occlusion model is particularly efficient. While the occlusion model learns the individual image elements, the layers of the softmax model interact to generate a particular image of occluding shapes. The softmax model requires a larger number of hidden units than the occlusion model and also leads to a set of hidden units which is less indicative of the shape of the image than the occlusion model. In further embodiments described herein the mask model used is preferably an occlusion model. Having said that, the softmax model is workable for many practical applications particularly those where the images being processed do not depict occluding objects.

Figure 5:
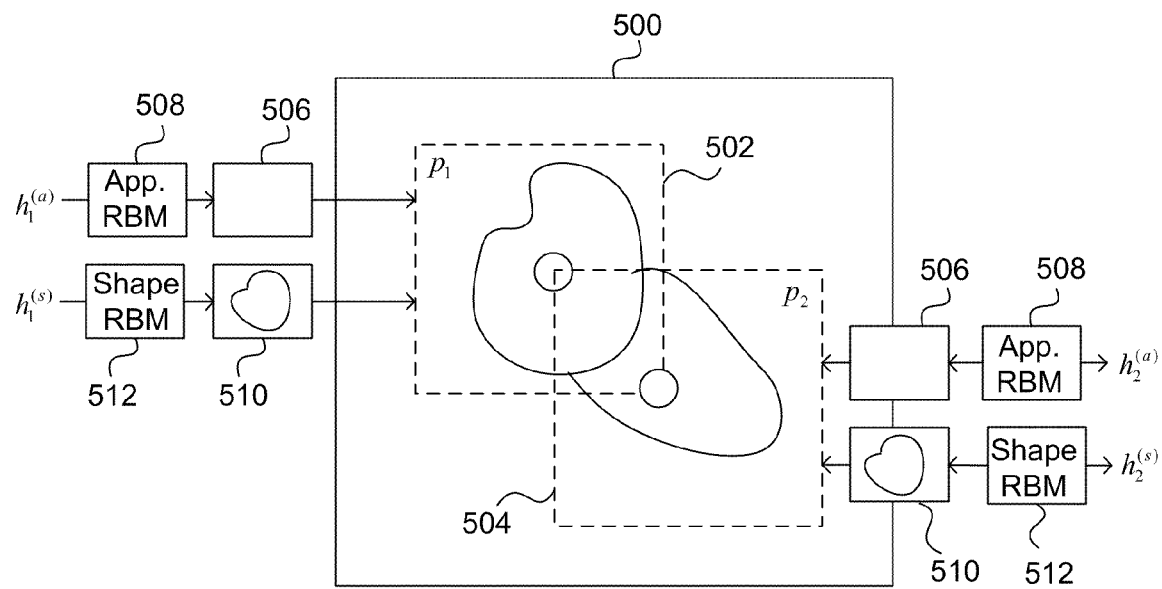
FIG. 5 is a schematic diagram of part of a field of masked RBMs.

FIG. 5 is a schematic diagram of part of a field of masked RBMs. An input image 500 is divided into a plurality of patches 502, 504. The appearance 506 of the image is modeled by a data structure stored in the memory holding a field of masked RBMs 508. The shape 510 of each patch is modeled by a data structure stored in the memory also containing a field of shape RBMs 512.

The image 500 can be divided into any number of image patches K. In FIG. 5 two patches 502 and 504 are shown. If the masked appearance RBMs used to model each patch are non-overlapping the memory is arranged to store the data structure holding the field of RBMs with one masked RBM per patch. Artifacts may appear at the boundaries between patches because the K patch appearance models that each pixel chooses between all have their patch boundaries in the same place and correlations between pixels on either side of a patch boundary are ignored.

If the boundaries of the masked appearance RBMs 508 held in a data structure are spatially offset so that the boundaries are each in a different place then boundary problems do not occur since there is always a model overlapping any patch boundary.

Each region described by a single appearance RBM can be thought of as a superpixel element. The superpixel elements are not required to be contiguous. The hidden variables of each appearance RBM can be described as a feature vector representing the appearance of each superpixel element.

In the case of the softmax and occlusion models as discussed above with reference to FIG. 4 the shape 510 of each image patch is modeled by a separate shape RBM. A set K of competing shape RBMs 512 is used to model the shape 510 of each image patch. The set of mask variables $m_i$ forms a mask image with a value for each image pixel indicating which of the K models it is explained by.

Because the feature vectors arise from a generative model it is possible to reconstruct the images from features and see exactly what is being captured and what is being lost. The use of feature vectors to reconstruct an image is described in more detail with reference to FIG. 8 below.

Figure 6:
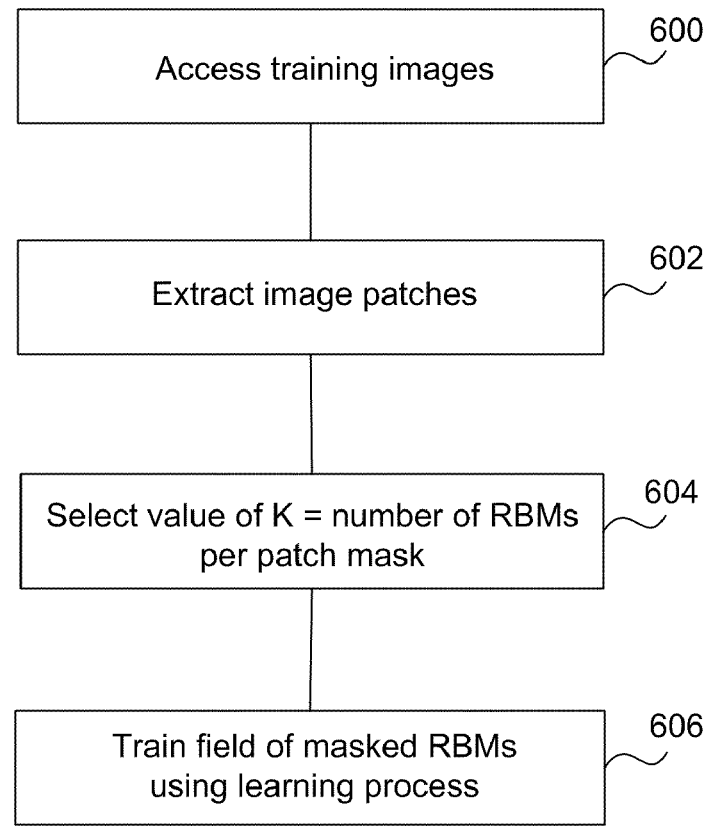
FIG. 6 is a flow diagram of a method of training a field of masked RBMs.

Training a field of masked RBMs is now described with reference to FIG. 6. The model is trained on a set of images 600 from which random image patches 602 have been extracted. The number of competing RBMs per patch is specified 604 and the field of masked RBMs is trained 606 using persistent contrastive divergence (or any other suitable training rule).

The training image set 600 can be any plurality of images from which random image patches 602 can be extracted. The number of competing RBMs K per image patch can be specified 604 or may be set to a default value. In an example where there are 4 bits per pixel this would mean that for a 16×16 pixel image patch a total of 1024 bits are used. In the case where K=1 all 1024 bits are used by the appearance model. In the case where K=2 the mask requires 256 bits, leaving 384 bits for each appearance model. For K=4 the mask requires 512 bits, leaving 128 bits for each appearance model.

The field of masked RBMs is then trained using persistent contrastive divergence 606 for example. The probability distribution of the appearance RBM is:

$$\log P(v, v_1, \ldots, v_K, h_1^{(a)}, \ldots, h_K^{(a)} | m) = \sum_i \left[ \log \delta(\hat{v}_{m_i} = v_i) + \sum_j \sum_k f(\theta, \hat{v}_{k,i}, h_{k,j}^{(a)}) \right] - \log C \quad (7)$$

and, for the occlusion model, the probability distribution of the mask model is given by equation 6. The joint probability (in the case of the occlusion model) is:

$$\log P\left( \begin{matrix} v, \hat{v}_1, \ldots, \hat{v}_K, h_1^{(a)}, \ldots, \\ h_K^{(a)}, m, s_1, \ldots, s_K, h_1^{(s)}, \ldots, h_K^{(s)}, S \end{matrix} \right) = \quad (8)$$

$$\sum_i \left[ \log \delta(\hat{v}_{m_i} = v_i) + \sum_j \sum_k f(\theta, \hat{v}_{k,i}, h_{k,j}^{(a)}) \right] +$$

$$\log P(S) + \sum_k s_{k,i} h_{k,j}^{(s)} W_{ij} +$$

$$\sum_i \left( \log \delta(s_{m_i} = 1) + \sum_{k/S(k) < S(m_i)} \log \delta(s_{k,i} = 0) \right) - \log C.$$

Because of the difficulty of computing the marginalization over the latent variables, the marginalizations are replaced by samples from the posterior distribution rather than computing the gradient of log P(v) with respect to the parameters.

Figure 7:
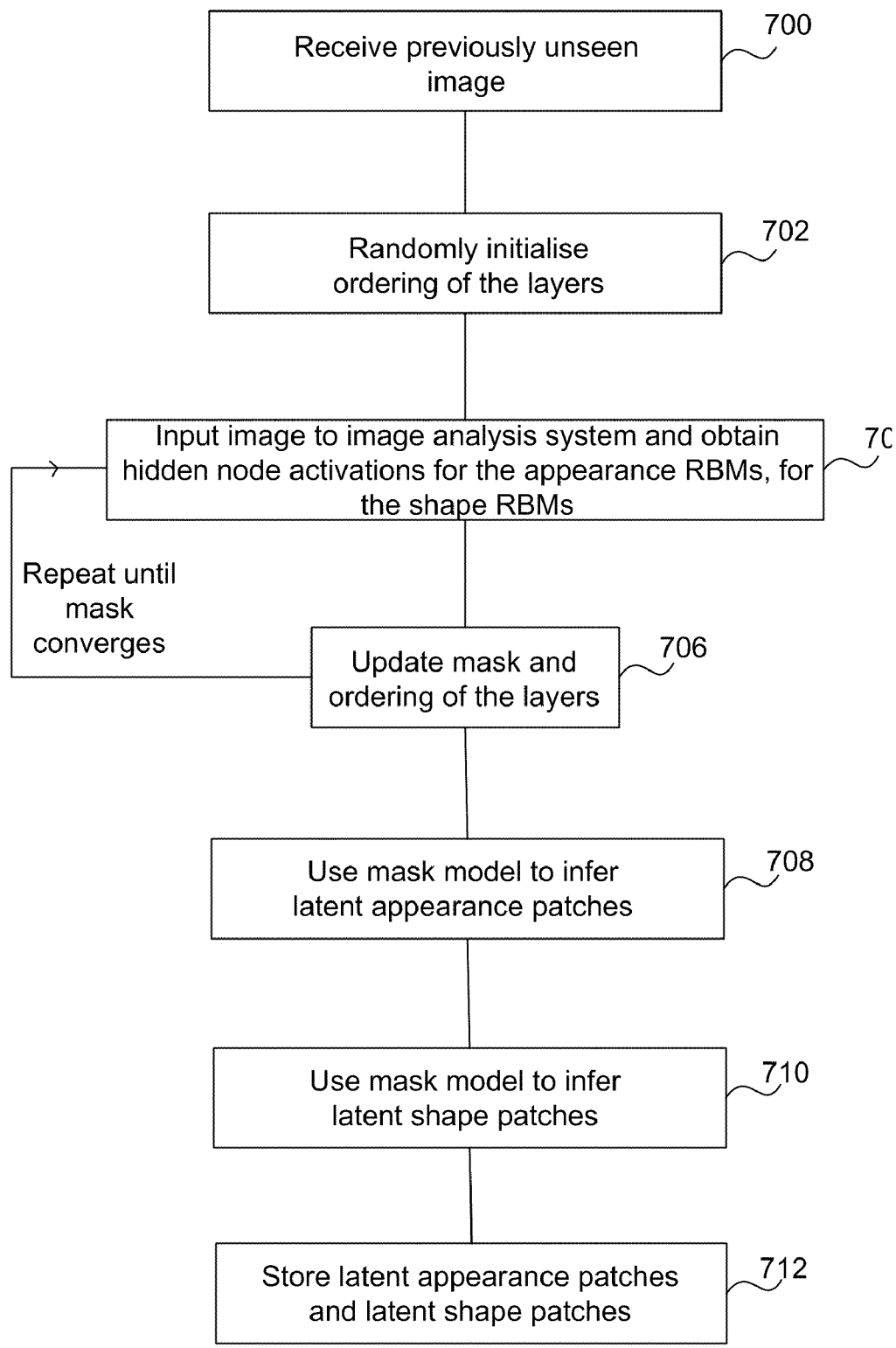
FIG. 7 is a flow diagram of a method of operation of the image processing system of FIG. 1.

FIG. 7 is a flow diagram of a method of operation of the image processing system of FIG. 1. The image processing system receives a previously unseen image 700 and initializes (to random values) a mask 702 in a data structure stored in the memory of the image processing system. The processor is arranged to input the image to the image analysis system 704 and to obtain the activations of the hidden nodes of the masked appearance RBMs. These activations are then used to update the mask 706. This is repeated until the mask converges. The latent appearance patches are then inferred 708. The mask model is then used to infer latent shape patches 710. The latent appearance patches and latent shape patches are then stored 712.

The image 700 can be any previously unseen image such as a natural image or other image as mentioned above. The image 700 is input into the image analysis system 704. At the beginning of the inference process, the mask m is randomly initialized 702. For the occlusion mask described above the ordering S is inferred given the mask. Then the hidden node activations of the masked appearance RBMs, and, for the softmax and the occlusion shape model, of the shape RBMs are obtained. To sample the mask it is necessary to know the values of $h_1^{(a)}, \ldots, h_K^{(a)}, h_1^{(s)}, \ldots, h_K^{(s)}, S$. The occluded parts of the latent shapes $s_1, \ldots, s_K$ are sampled using Gibbs sampling. Given $s_1, \ldots, s_K$, the distribution of the hidden shape variables $h_1^{(s)}, \ldots, h_k^{(s)}$ can be easy to sample from. Sampling $h_1^{(s)}, \ldots, h_k^{(s)}$ given the mask and the observed variables determined by the mask v requires first sampling the unobserved parts of the conditional distribution given the observed parts (determined by m and v). Once $\hat{v}_1, \ldots, \hat{v}_K$ is known, the conditional distribution of the hidden appearance variables $h_1^{(a)}, \ldots, h_K^{(a)}$ can also be factorial and easy to sample from. Once these variables are known the ordering S and the latent shapes $s_1, \ldots, s_K$ are resampled as described above. The mask is then updated 706. The procedure may be repeated several times until the mask converges.

The latent appearance patches are inferred 708. The joint probability distribution of the appearance RBM is described in equation 7 above. Given the mask m and the observed variables v determined by the mask the unobserved image elements in the latent appearance patches can be sampled using Gibbs sampling to infer the latent appearance patches.

The latent shape patches can also be inferred 710. Similar to inferring the latent appearance patches the occluded pixels $s_K$ are sampled using Gibbs sampling to infer the latent shape patches. The latent appearance patches and latent shape patches are then stored 712. The latent shape and appearance patches can be used as input for further processing as described in FIG. 8.

Figure 8:
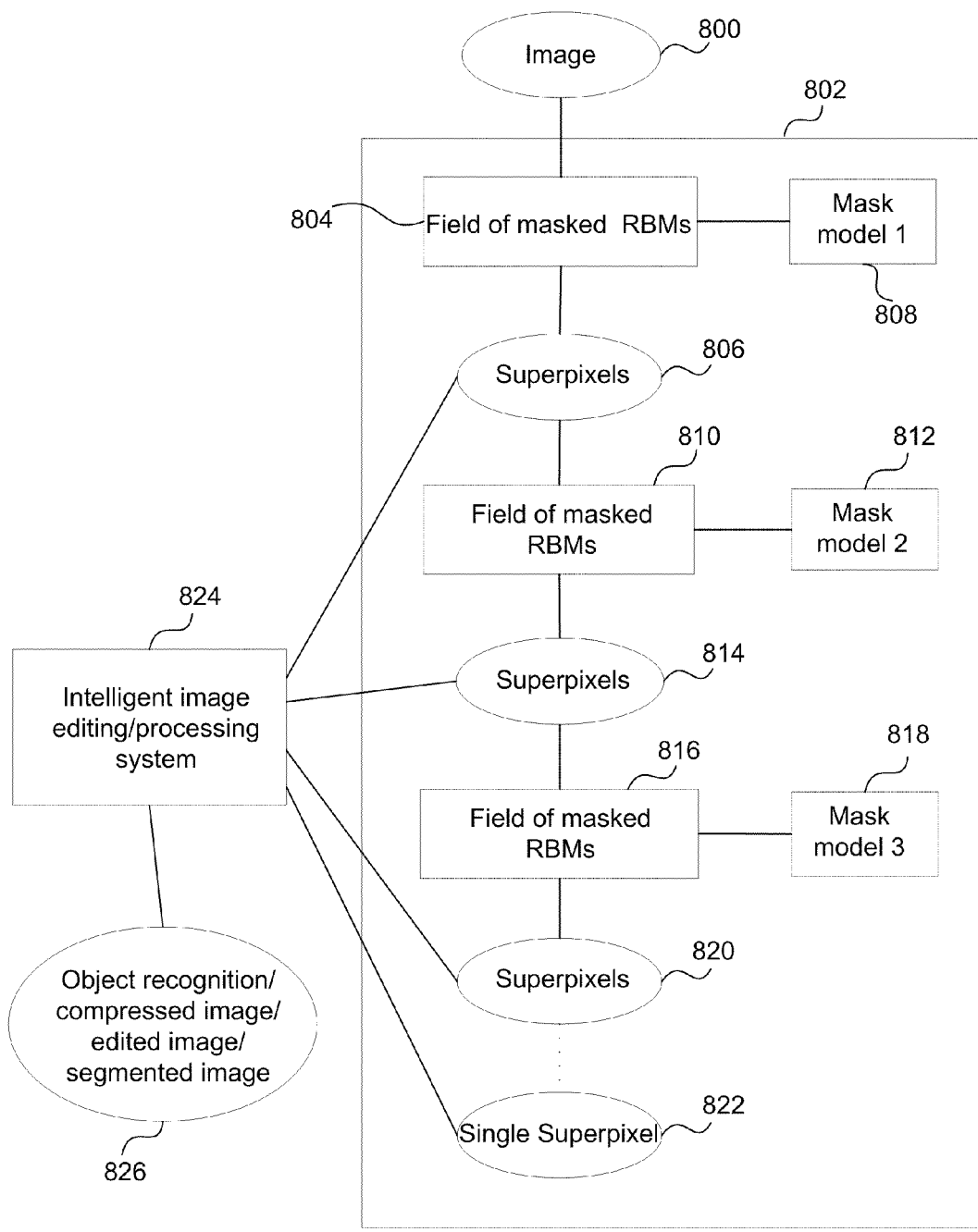
FIG. 8 shows a plurality of fields of masked RBMs connected in series and providing input to an intelligent image editing or processing system.

FIG. 8 shows a plurality of fields of masked RBMs connected in series and providing input to an intelligent image editing or processing system 824. An image 800 is initially input to the plurality of masked appearance RBMs connected in series 802. The first field of masked appearance RBMs 804 decomposes the image into a set of superpixel elements 806 given a mask model 808. The superpixel elements 806 are used as input to a further field of masked appearance RBMs 810. Using a further mask model 812 the appearance RBMs 810 compute a further set of superpixel elements 814 from the first set of superpixel elements 806. Additional RBMs 816 can be added in series using further mask models 818 to compute another layer of superpixel elements 820. Any number of additional RBMs can be added until the entire output image consists of a single superpixel element 822. The output superpixel elements from each layer can be used as input to an intelligent image editing/processing system 824 which in a non-limiting list of examples may carry out tasks 826 such as: object recognition; image compression, image editing; image segmentation.

In an example the output superpixel elements 806 from the RBM 804 comprise patches laid out on an 8×8 grid. A new "image" one-eighth of the size of the original image is formed. The pixels are the feature vectors ($h^{(a)}, h^{(s)}$) of the first superpixel elements rather than the continuous RGB values of the input natural image. In one example the feature vectors may consist of 512 bits where 384 bits are associated with the hidden shape variables ($h^{(s)}$) and 128 bits are associated with the hidden appearance variables ($h^{(a)}$). The overlapping masked appearance RBMs 810 of the second level cover a plurality of first level superpixel elements and hence learn how the shape and appearance of nearby superpixel elements go together. Mask models 812 are also inferred for the second level, leading to second level superpixel elements which merge a number of first level superpixel elements.

In an example the image 800 comprises an image of a bottle. The first masked appearance RBMs 804 may split the bottle into four superpixel elements 806. Three describing the appearance of the green glass of the bottle and separated by shape: one describing the neck of the bottle; one describing the upper half of the bottle; one describing the lower half of the bottle. One superpixel element may describe the label of the bottle, specifying its texture (paper) and shape (oval).

The superpixel elements are used as input to the second field of masked RBMs 810. The masked appearance RBMs 810 will look for patterns in the bit vectors of the superpixel elements 806. The three pixels describing the appearance of the bottle are very similar so the RBMs 810 may represent these with a single superpixel element. As the number of bits available at each level does not increase it is necessary to loose some information about the image. For example the color of the bottle may not be represented.

A further level of masked RBMs 816 may, after training recognize that the combination of feature vectors for the glass bottle and label comprise an single object and ultimately merge them into a single superpixel element 822. As the number of levels increases larger parts of the image are observed. The larger superpixel elements can lead to an increasingly abstract representation of the image. The outputs one or more layers of masked RBMs can be used as input into an intelligent image editing/processing system 824. The output from a plurality of layers can be combined depending on what aspect of the image is analyzed. Some examples of intelligent image editing/processing systems will be described with respect to FIG. 9 and FIG. 10 below.

Figure 9:
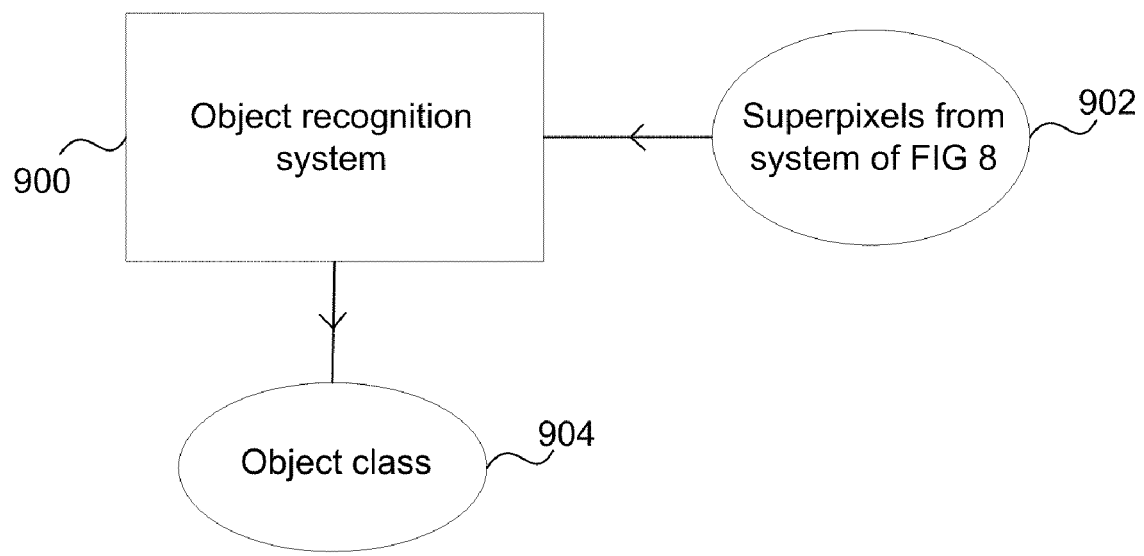
FIG. 9 is a schematic diagram of an object recognition system arranged to receive superpixel elements from the system of FIG. 8.
Figure 10:
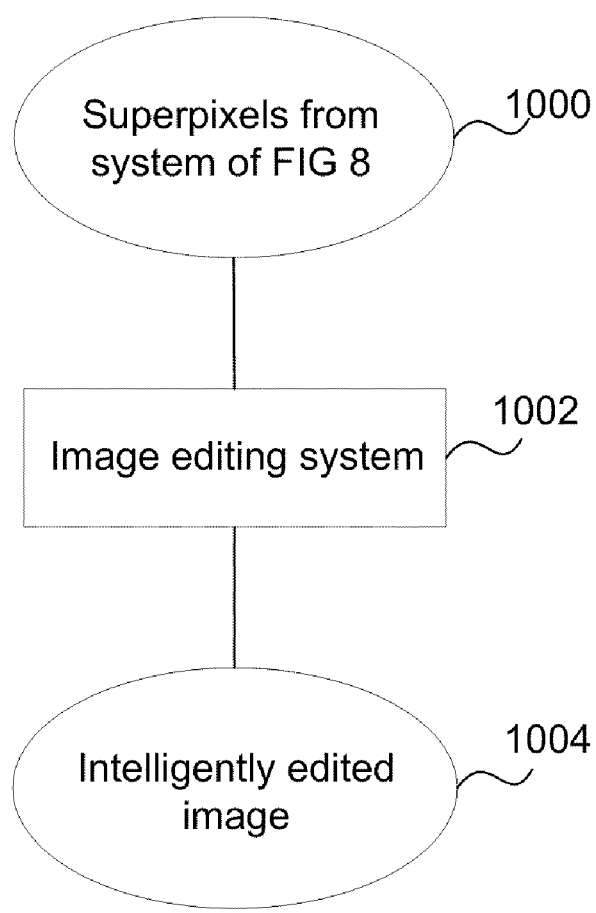
FIG. 10 is a schematic diagram of an image editing system arranged to receive superpixel elements from the system of FIG. 8.

FIG. 9 is a schematic diagram of an object recognition system arranged to receive superpixel elements from the system of FIG. 8. The object recognition system 900 uses as input at least some of the superpixel elements 902 as described in FIG. 8 above. In an example the object recognition system is required to find the neck of a bottle in an image. In this example the object recognition system would look at the image superpixel elements from the first level. The first level superpixel elements provide the greatest detail on small structures in the image to find the narrowest part of the object. After training the object recognition system may recognize that the combination of bit vectors from the first field of appearance RBMs specifies the appearance of the image as "green" and the texture as "glass". It may also recognize that the merged shape superpixel elements (from the second field of appearance RBMs) identifies the object as a bottle. By combining this information the system is therefore able to recognize both that the object in the image is a bottle and label which part is the neck of the bottle FIG. 10 is a schematic diagram of an image editing system arranged to receive superpixel elements from the system of FIG. 8. Superpixel elements 1000 as described in FIG. 8 above are used as input to the image editing system 1002. In an example it may be required to remove fine structures from an image. The superpixel elements from 1000 are input into the image editing system. The first level superpixel elements from the beta RBM are used as these specify the finest detail about the structure of the image. Superpixel elements specifying structures below a certain level of thinness are identified using the superpixel elements and these structures can then be removed by the intelligent imaging system.

Figure 11:
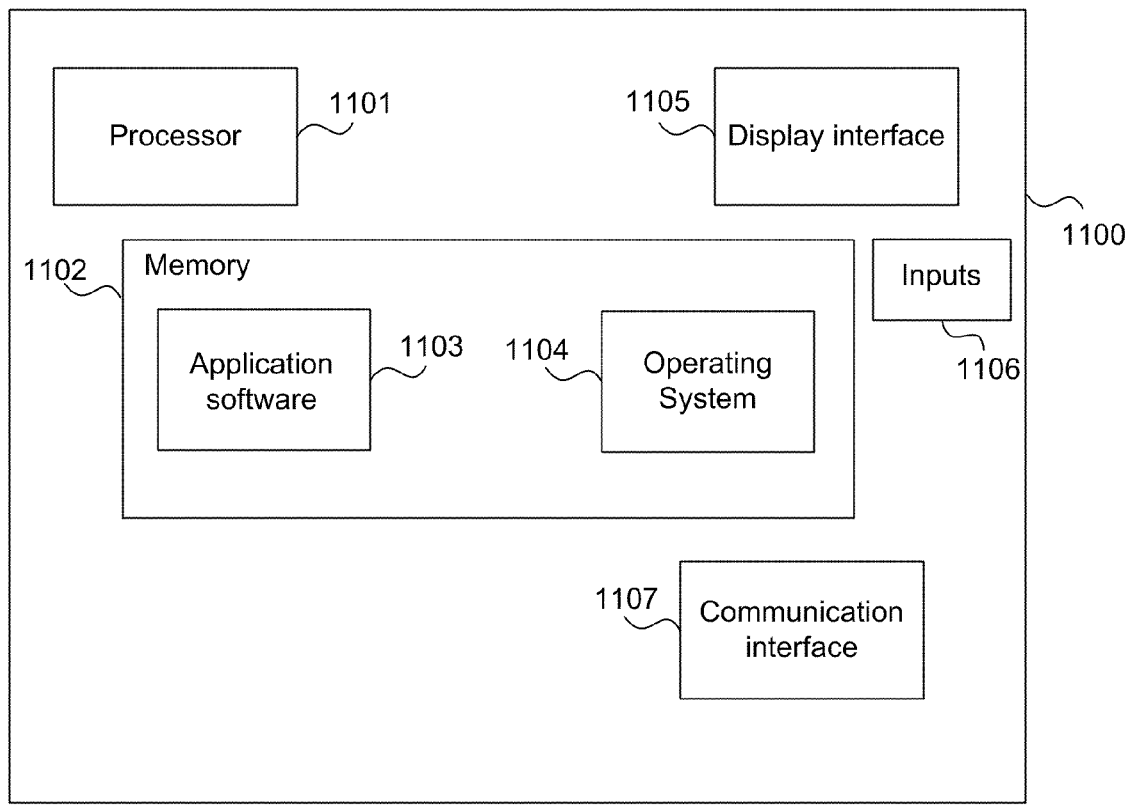
FIG. 11 illustrates an exemplary computing-based device in which embodiments of an image processing system using masked RBMs may be implemented.

FIG. 11 illustrates various components of an exemplary computing-based device 1100 which may be implemented as any form of a computing and/or electronic device, and in which embodiments of image processing using masked restricted Boltzmann machines may be implemented.

The computing-based device 1100 comprises one or more inputs 1106 which are of any suitable type for receiving media content, Internet Protocol (IP) input, digital images, documents, continuous data or any other data to be processed using a restricted Boltzmann machine. The device also comprises communication interface 1107 which is optional and enables the device to communicate with other entities over a communication network.

Computing-based device 1100 also comprises one or more processors 1101 which may be microprocessors, controllers or any other suitable type of processors for processing computing executable instructions to control the operation of the device in order to process data using one or more restricted Boltzmann machines. Platform software comprising an operating system 1104 or any other suitable platform software may be provided at the computing-based device to enable application software 1103 to be executed on the device.

The computer executable instructions may be provided using any computer-readable media, such as memory 1102. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system (via a display interface 1105) integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An image processing apparatus comprising:
   an input arranged to receive at least one patch of an image;
   a memory storing a data structure holding at least one masked restricted Boltzmann machine comprising a plurality K of restricted Boltzmann machines each arranged to receive input from the patch of the image and having shared parameters and also comprising a mask having a variable for each image element of the patch specifying which of the plurality of restricted Boltzmann machines is to be used for that image element;
   a processor arranged to input the patch to the masked restricted Boltzmann machine and obtain hidden node activations of the plurality of restricted Boltzmann machines;
   an output arranged to provide a plurality of superpixel elements being latent features of the patch and comprising the hidden node activations of the plurality of restricted Boltzmann machines.

2. An apparatus as claimed in claim 1 wherein the input is arranged to receive an image and divide the image into a plurality of patches and wherein the memory is arranged to store the data structure holding a field of masked restricted Boltzmann machines with one masked restricted Boltzmann machine per patch.

3. An apparatus as claimed in claim 1 wherein the input is arranged to receive an image and divide the image into a plurality of partially overlapping patches and wherein the memory is arranged to store the data structure holding a field of masked restricted Boltzmann machines with K masked restricted Boltzmann machines per patch.

4. An apparatus as claimed in claim 1 which further comprises a memory holding a mask model and wherein the processor is further arranged to infer a second plurality of superpixel elements being latent shape features of the patch using the mask model.

5. An apparatus as claimed in claim 2 wherein the memory holds a plurality of fields of masked restricted Boltzmann machines which are connected in series with the superpixel element outputs of one field of masked restricted Boltzmann machines providing inputs to another field of masked restricted Boltzmann machines.

6. An object recognition system comprising:
   an input arranged to receive an image of a scene depicting at least one object;
   a memory storing a data structure holding a first field of masked restricted Boltzmann machines each comprising a plurality K of restricted Boltzmann machines each arranged to receive input from a patch of the image and having shared parameters and also comprising an image mask having a variable for each image element specifying which of the plurality of masked restricted Boltzmann machines is to be used for that image element;

a processor arranged to input the image to the first field of masked restricted Boltzmann machine and obtain first superpixel elements comprising hidden node activations of the plurality of restricted Boltzmann machines;

wherein the memory further comprises a second field of masked restricted Boltzmann machines and the processor is arranged to input the first superpixel elements to the second field of masked restricted Boltzmann machines and obtain second superpixel elements comprising hidden node activations of the restricted Boltzmann machines of the second field;

a classifier arranged select an object class from a plurality of specified object classes on the basis of at least some of the first and second superpixel elements such that the at least one object depicted in the image is a member of the selected object class.

7. An object recognition system as claimed in claim 6 wherein the memory further comprises additional fields of masked restricted Boltzmann machines connected in series with the first and second fields of masked restricted Boltzmann machines and with the superpixel elements of a given field providing input to the next field in the series.

8. An object recognition system as claimed in claim 6 wherein the input is arranged to divide the image into a plurality of image elements such that each image element provides input to the K restricted Boltzmann machines.

9. An object recognition system as claimed in claim 6 wherein the memory holds a mask model and wherein the processor is further arranged to infer a plurality of shape superpixel elements using the mask model.

10. An object-recognition system as claimed in claim 9 wherein the memory stores a mask model comprising a data structure storing a uniform distribution for the mask.

11. An object-recognition system as claimed in claim 9 wherein the memory stores the mask model comprising a data structure storing a field of shape restricted Boltzmann machines with one shape restricted Boltzmann machine for each of the plurality K of restricted Boltzmann machines.

12. An object-recognition system as claimed in claim 11 wherein the memory stores the mask model which contains a specified depth ordering requirement for the plurality K of shape restricted Boltzmann machines with one shape restricted Boltzmann machine for each of the plurality K of restricted Boltzmann machines.

13. A method of processing an image comprising:

at an input receiving an image of a scene;

at a memory storing a data structure holding a first field of masked restricted Boltzmann machines each comprising a plurality K of restricted Boltzmann machines each arranged to receive input from a patch of the image and having shared parameters and also comprising an image mask having a variable for each image element specifying which of the plurality of masked restricted Boltzmann machines is to be used for that image element;

at a processor inputting the image to the first field of masked restricted Boltzmann machines and obtaining first superpixel elements comprising hidden node activations of the plurality of restricted Boltzmann machines;

and storing the superpixel elements at the memory.

14. A method as claimed in claim 13 which further comprises, at the memory, storing a second field of masked restricted Boltzmann machines and using the processor to input the first superpixel elements to the second field of masked restricted Boltzmann machines and store second superpixel elements comprising hidden node activations of the restricted Boltzmann machines of the second field.

15. A method as claimed in claim 14 which further comprises storing at the memory additional fields of masked restricted Boltzmann machines connected in series with the first and second fields of masked restricted Boltzmann machines and using the superpixel elements of a given field as input to the next field in the series.

16. A method as claimed in claim 13 which further comprises, at the memory, storing a mask model of the image mask and using the processor to infer a plurality of shape superpixel elements using the mask model.

17. A method as claimed in claim 16 which comprises, at the memory, storing the mask model using a data structure storing a uniform distribution for the mask image.

18. A method as claimed in claim 16 which comprises, at the memory, storing the mask model comprising a data structure storing a field of shape restricted Boltzmann machines with one shape restricted Boltzmann machine for each of the plurality K of restricted Boltzmann machines.

19. A method as claimed in claim 16 which comprises, at the memory, storing the mask model which contains a specified depth ordering requirement for the plurality K of shape restricted Boltzmann machines with one shape restricted Boltzmann machine for each of the plurality K of restricted Boltzmann machines.

20. A method as claimed in claim 13 which further comprises providing the superpixel elements as input to any of: an object recognition system; an image editing system; an image segmentation system; a medical image analysis system.

* * * * *